(12) United States Patent
Willinger et al.

(10) Patent No.: US 6,684,818 B2
(45) Date of Patent: Feb. 3, 2004

(54) BIRDCAGE PERCH

(75) Inventors: Jonathan Willinger, Tenafly, NJ (US); Klaus Woltmann, Demarest, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

(21) Appl. No.: 10/365,360

(22) Filed: Feb. 12, 2003

(65) Prior Publication Data

US 2003/0188697 A1 Oct. 9, 2003

Related U.S. Application Data

(60) Provisional application No. 60/370,200, filed on Apr. 5, 2002.

(51) Int. Cl.[7] ................................................ A01K 31/12
(52) U.S. Cl. ..................................................... 119/468
(58) Field of Search ............................. 119/459, 467, 119/468, 52.2, 57.8; D30/110, 124

(56) References Cited

U.S. PATENT DOCUMENTS

| | | | | |
|---|---|---|---|---|
| 1,331,908 A | * | 2/1920 | Frey | 119/468 |
| 1,951,550 A | * | 3/1934 | Little | 119/468 |
| 2,076,734 A | * | 4/1937 | Leindorf | 119/468 |
| 2,241,259 A | * | 5/1941 | Hanson | 119/468 |
| 2,570,663 A | * | 10/1951 | Guarino | 119/468 |
| 5,215,039 A | * | 6/1993 | Bescherer | 119/52.2 |
| 5,533,466 A | * | 7/1996 | Kohus et al. | 119/459 |
| 5,588,397 A | * | 12/1996 | Johnakin, III | 119/468 |
| 6,332,431 B1 | * | 12/2001 | Brown | 119/468 |

* cited by examiner

*Primary Examiner*—Charles T. Jordan
*Assistant Examiner*—Elizabeth Shaw
(74) *Attorney, Agent, or Firm*—Katten Muchin Zavis Rosenman

(57) ABSTRACT

A lightweight perch formed from plastic, wood or the like, has an outer surface on which is applied a granular material such as sand or the like. A thin layer of adhesive or solvent may be used to attach the granular material to the perch. The resultant perch duplicates the healthy, stimulative effects of expensive concrete and sand perches at a tremendously reduced weight and cost.

35 Claims, 4 Drawing Sheets

100

BIRDCAGE PERCH

CROSS-REFERENCE TO RELATED APPLICATION

This application claims priority under 35 U.S.C. §119(e) from U.S. Provisional Application No. 60/370,200, filed Apr. 5, 2002.

FIELD OF THE INVENTION

The present invention relates to a birdcage perch, and more particularly to a lightweight, inexpensive perch having an outer surface and a layer of granular material adhered thereto.

BACKGROUND OF THE INVENTION

An important part of caged bird-keeping is the use of perches for pet birds to stand on. The perches simulate the branches of trees that birds stand on in the wild. There are many types of perches that have been produced in the past. These have included wooden dowels of varying lengths, actual tree branches, extruded plastic rods and injection molded plastic pieces.

There are problems with each of these prior products. The wooden dowels have little texture, which is not conducive to keeping the bird's claws healthy. The tree branches can deteriorate and are expensive to make ready for attachment to the cage. The plastic rods and molded pieces typically do not have a rough enough or deep enough texture to exercise the toes of the bird's feet. Injection molded perches are typically open on the bottom, thereby having a large open gap such that the end of the claws is not pressed against anything. Extruded rods cannot be varied in diameter, thereby leading to a lack of stimulation of the feet and claws.

It is known art to make heavy-duty perches out of material such as concrete and sand. These perches are generally heavy and expensive and sold for parrots and other expensive birds. Typically, these items consist of a centrally located metal screw that runs through the entire center of the perch. Typically, the screw would be one eighth to one quarter inch in diameter and be surrounded by a circular shaped sand or concrete cylinder such that the entire perch is one half to one inch or more in diameter. The benefit of the sand or concrete is to create a rough surface so that the bird's feet and claws can be exercised. In some of these type perches the diameter of the perch is varied from place to place to further exercise such bird's feet and claws. The problem of such solid sand and concrete perches is their weight and their expense. Typically these perches retail for a minimum of $12 and as much as $30, making them unaffordable for the typical owner of inexpensive caged birds such as parakeets (also called budgies or budgerians), finches, canaries, cockatiels and lovebirds.

SUMMARY OF THE INVENTION

A lightweight perch is formed from plastic, wood or the like and has an outer surface formed from a material that permits adhesion of a thin layer of granular material thereon. In one embodiment, a thin layer of adhesive is applied to the outer surface of the perch, followed by a thin layer of granular material such as sand. The resultant perch duplicates the healthy, stimulative effects of expensive concrete and sand perches at a tremendously reduced weight and cost.

DETAILED DESCRIPTION OF THE PREFERRED EMBODIMENTS

Figure 1:
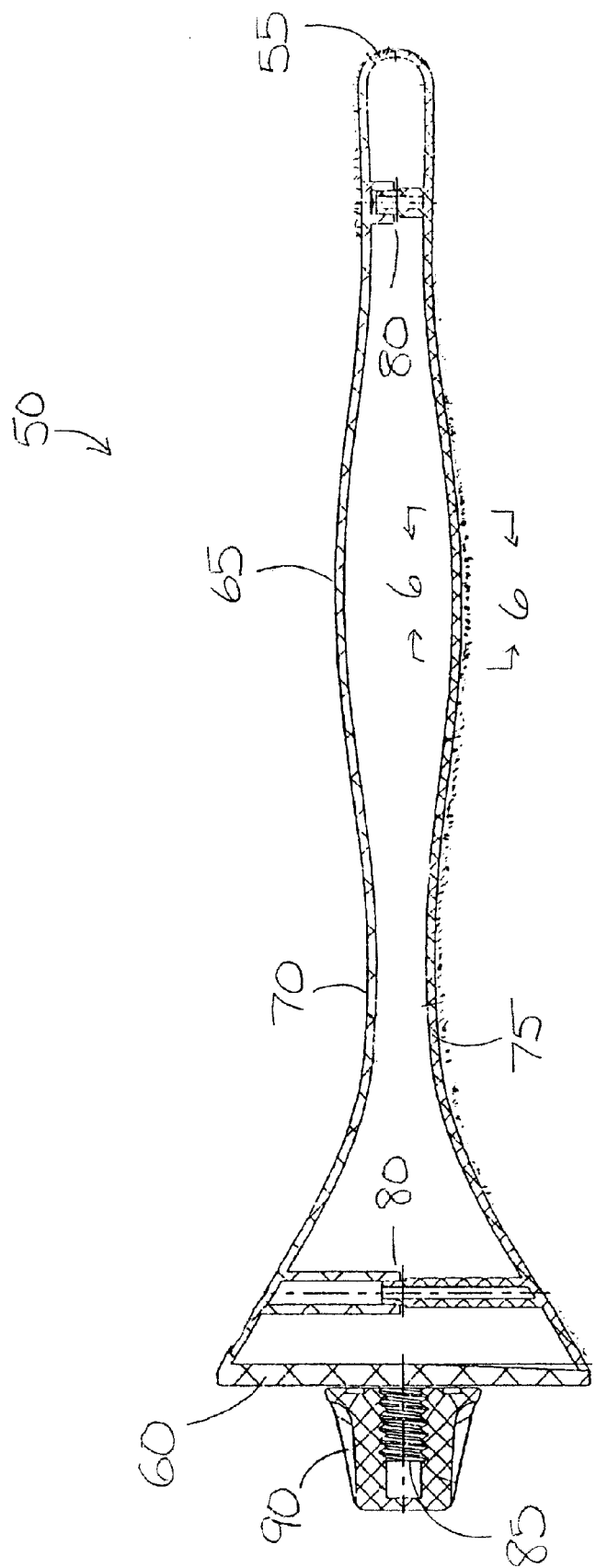
FIG. 1 is a cross section view of one embodiment of the perch of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
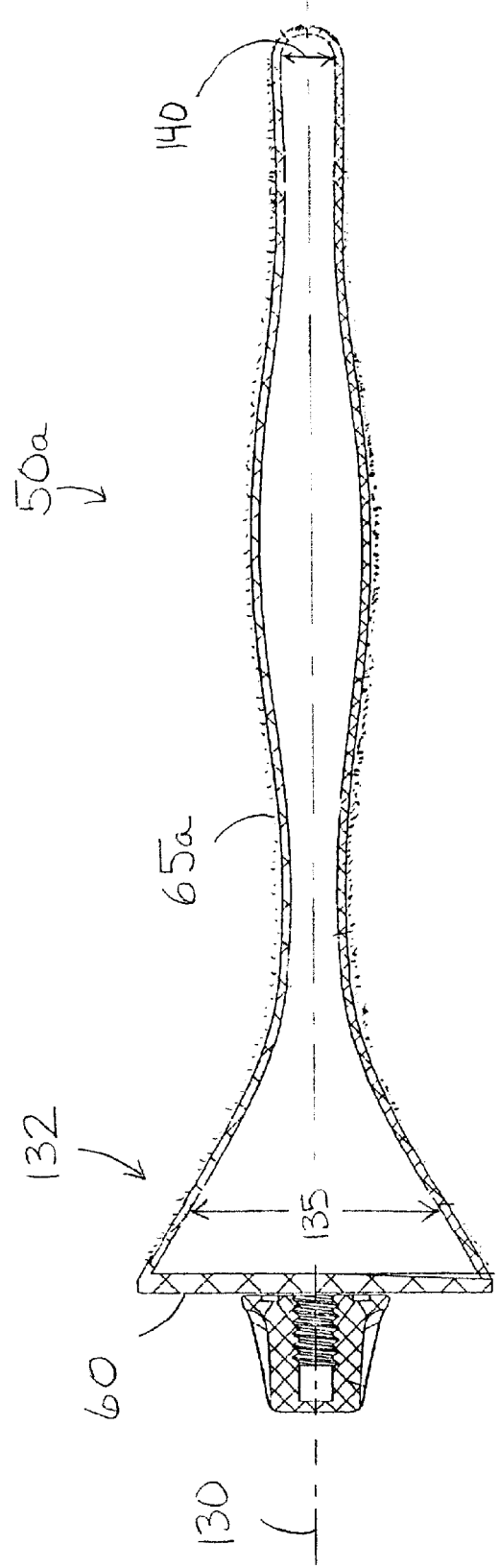
FIG. 2 is a view of an alternative embodiment of the perch of the invention.

FIG. 1 is a cross-section of one embodiment of a perch 50 of the present invention having a tip 55, a base 60 and an outer gripping surface 65. The perch 50 is hollow and formed by joining first and second halves 70, 75 via a joinder arrangement 80 or some other means. Alternatively, an outer gripping surface 65a of a perch 50a may be molded as a single piece as shown in FIG. 2.

In accordance with the perch of the present invention, a plastic perch is first manufactured. The perch 50 can be manufactured by means of an extruded rod and cutting said rod at lengths appropriate for a perch, such as lengths of six, eight, ten or twelve inches. Alternatively, a perch can be injection molded to such lengths. In either event, or if any other plastic means are used, the plastic utilized must be produced from a non-olefinic or other material that will permit adhesion of glues and solvents. Alternatively, the perch can be made from a wood dowel or other materials that will permit adhesion of glues and solvents.

Figure 3:
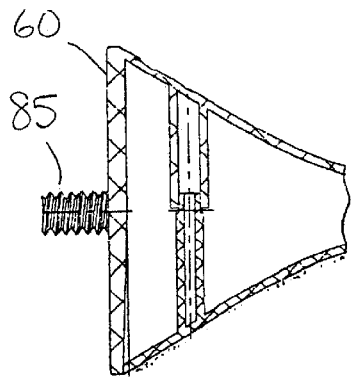
FIG. 3 is a close-up view of the fastener of the perch of the invention.
Figure 4:
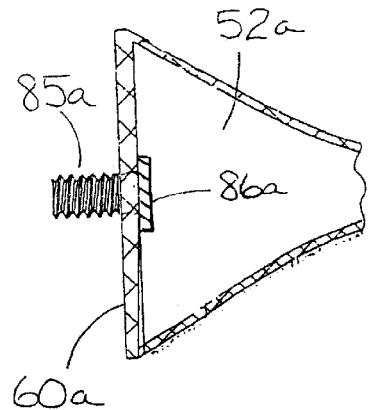
FIG. 4 is a close-up view of an alternative embodiment of the fastener.

Returning to the embodiment of FIG. 1, the two halves 70, 75 may be snapped, glued or sonically welded together. Such halves 70, 75 may be formed by injection-molding or by other means. Other joinder arrangements 80 and methods of connecting the two halves 70, 75 are surely contemplated. A fastener 85 (see also FIG. 3) such as a screw is preferably integrally formed into said base 60 either by co-molding said fastener 85 with said base 60, or by embedding the fastener 85 into said base 60. Alternatively, the fastener and base could be produced in a single mold. In either case, the fastener 85 becomes effectively irremovable from or through the base 60. Alternatively as shown in FIG. 4, a fastener 85a may be press-fit through the base 60a, such that the head 86a of the fastener 85a extends into the hollow interior 52a of the perch, again resulting in the inability to extract the fastener 85, 85a from the base 60, 60a.

Figure 5:
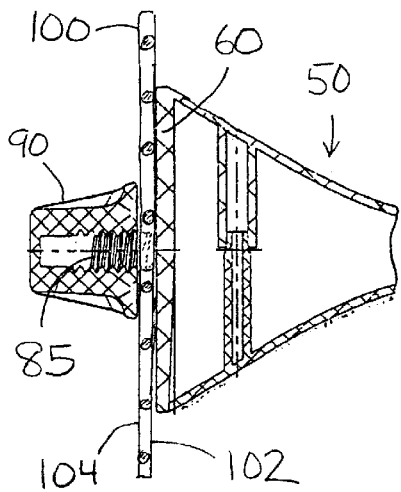
FIG. 5 illustrates the attachment of the perch to a birdcage wall.

As shown in FIG. 5, a nut or cap 90 is engageable with the fastener 85 to secure the perch 50 to a birdcage wall 100. The fastener 85 is dimensioned to extend through an opening in the birdcage wall 100 such that the perch base 60 lies adjacent an inner side 102 of the birdcage wall 100, while the cap 90 is adapted to engage said fastener 85 on an outer side 104 of the birdcage wall 100 for securely clamping said perch 50 to said birdcage wall 100.

Figure 6:
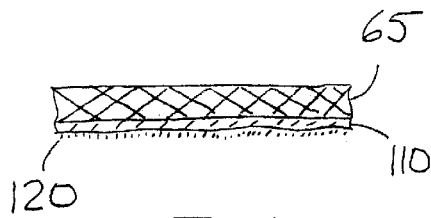
FIG. 6 is a section taken along lines 6—6 of FIG. 1.

After molding or otherwise producing a perch shaped object made of adhesion permitting material as discussed above, a thin layer of glue or solvent 110 (FIG. 6) is applied. Alternatively, in addition to glues and solvents, one may be able to lacquers and paints. For these purposes, a molded or extruded perch can be lightly painted with a thin layer of solvent such as tolulene or MEK (Methyl Ethyl Ketone). Also, at greater expense epoxy resins can be utilized. With wood dowels other types of glues may be applied such as casein (e.g., Elmer's® glue).

Figure 7:
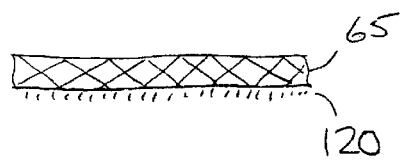
FIG. 7 is an alternative section taken along lines 6—6 of FIG. 1.
Figure 9:
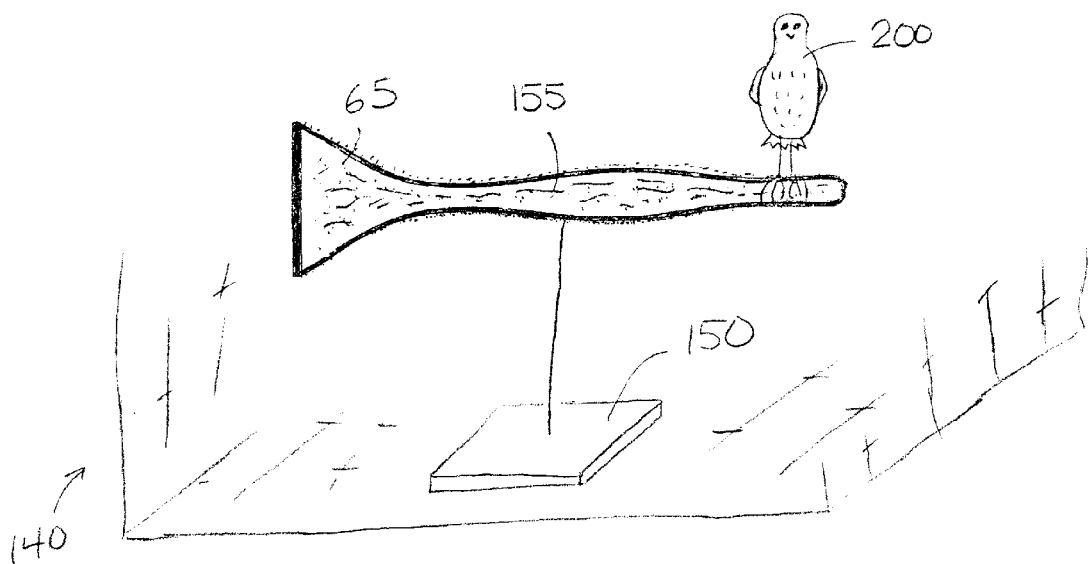
FIG. 9 illustrates a freestanding perch of the invention.

After application of said layer of adhesive or solvent 110, a thin layer of granular material 120 is applied over the solvent 110. For purposes of explanation, the granular material 120 will be described as sand, although other granular material may be used. The sand 120 may be applied by various means, such as by brush, sprinkling, spraying or dipping. If the perch is made out of plastic resin, the perch can be heated so that the outer gripping surface melts and the sand is applied to the outer surface without using solvents or glues (FIG. 7). In this case, the sand would sink into the softened plastic and then become partially embedded in the plastic surface after the plastic cools, with the goal being for the entire gripping surface 65 of the perch 50 to be covered with sand 120. Alternatively, most of the gripping surface 65, or only certain select portions of the gripping surface 65 may be covered with sand 120 as the case may be. The resulting perch duplicates the healthy, stimulative effects of expensive concrete and sand perches at a tremendously reduced weight and cost. In addition to a granular coating, a further texture or contour 155 (FIG. 9) may be applied to the outer gripping surface 65 of the perch to increase the stimulative effect on the bird 200 (FIG. 9). Such further texture 155 may be fashioned into the outer gripping surface 65 during a molding operation, or it may be achieved by scoring the outer gripping surface 65 with a sharp instrument, the latter being preferred if the perch is made from wood.

The perch 50 is preferably produced in a "wavy" manner, varying the diameter of the perch at various points along its longitudinal axis 130 (FIG. 2) in order to facilitate variation of the tension on the part of the bird's feet. The perch 50 is also preferably produced or molded as a hollow structure and with the outer gripping surface extending completely around the longitudinal axis 130 (i.e., presenting a continuous surface as opposed to being open on the bottom as known in the art). The diameter 140 at the perch tip is small as compared with the diameter 135 near the base 60. A "flared out" portion 132 is provided with a steeply increasing diameter 135 that increases towards the base 60 and the point of attachment to the cage wall (FIG. 5). This portion 132 discourages the bird 200 (FIG. 9) from sitting very close to the cage wall and helps prevent feces from dropping on the bars of the cage (see FIG. 5) and the inside walls of the bottom tray, which also facilitates cleaning of the cage.

Figure 8:
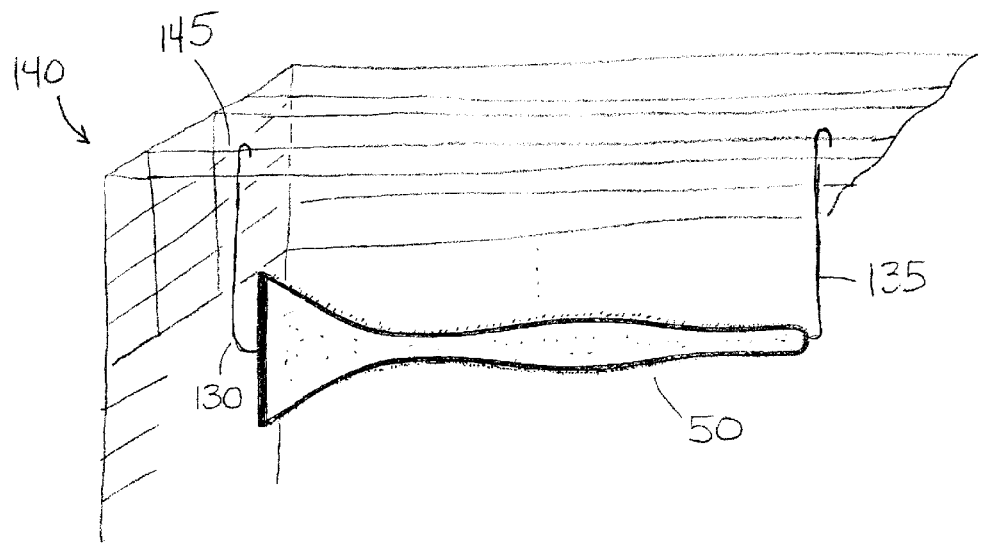
FIG. 8 illustrates a perch of the invention formed into a swing.

The perch of the present invention may be supported on a cage as shown in FIG. 5, or the perch may be made into a swing (FIG. 8) or be made freestanding (FIG. 9). If the perch is formed into a swing, wires 130, 135 could be inserted into the base and tip for attachment to the top 145 of the cage 140 as shown. Other attachment means are contemplated. For example, the perch could be attached between opposite ends of a cage (not shown), wherein it spans the length or width of the cage, or it could be attached on a diagonal (not shown) using simple slotted cutouts on each end of the perch that engage the cage wires. The perch 155 can also be attached to a device 155 such as a platform or the like, which sits at the bottom of the cage 140 or is attached thereto (FIG. 9).

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

We claim:

1. A lightweight perch that is hollow and suitable for gripping by a bird and attaching to a birdcage comprising:
   a) a tip, a base opposite said tip and an outer gripping surface disposed between said tip and base, said tip, base and outer gripping surface formed from an injection-molded plastic material,
   b) a thin layer of sand adhered to said outer gripping surface by a thin layer of adhesive between the outer gripping surface and the granular material such that said thin layer of sand becomes integrally formed into said outer gripping surface with said thin layer of sand, said thin layer of adhesive and said outer gripping surface forming three distinct layers, and
   c) means for attaching the perch to a birdcage,
   d) wherein said attaching means further comprises a threaded fastener integrally formed with said base.

2. A lightweight perch in accordance with claim 1, wherein said outer gripping surface is formed from a material that permits adhesion of one of glues, solvents, paints and lacquers.

3. A lightweight perch in accordance with claim 1, wherein said outer gripping surface is formed from a non-olefinic material.

4. A lightweight perch in accordance with claim 1, wherein said outer gripping surface is initially formed from a plurality of parts that are joined together.

5. A lightweight perch in accordance with claim 4, wherein said plurality of parts are snapped together.

6. A lightweight perch in accordance with claim 4, wherein said plurality of parts are sonically welded together.

7. A lightweight perch in accordance with claim 4, wherein said plurality of parts are glued together.

8. A lightweight perch in accordance with claim 1, wherein said outer gripping surface flares outwardly adjacent the base to deter a bird from gripping the outer surface adjacent the base and wherein said first end, second end and outer grinning surface are formed as a one-piece, hollow, injection-molded structure.

9. A lightweight perch in accordance with claim 8, wherein the diameter of the perch tip is less than the diameter of the perch base.

10. A lightweight perch in accordance with claim 8, wherein said perch is initially formed as two injection-molded sections that are secured together into said one piece, hollow, injection-molded structure.

11. A lightweight perch in accordance with claim 1, wherein the perch further comprises a longitudinal axis and wherein the diameter of the perch varies along the longitudinal axis to vary tension felt by a bird gripping the outer gripping surface.

12. A lightweight perch in accordance with claim 1, wherein said layer adhesive is a layer of epoxy between the outer gripping surface and the thin layer of sand for aiding in the adhesion between the outer gripping surface and the thin layer of sand.

13. A lightweight perch in accordance with claim 1, wherein said layer of adhesive is a layer of paint between the outer gripping surface and the thin layer of sand for aiding in the adhesion between the outer gripping surface and the thin layer of sand.

14. A lightweight perch in accordance with claim 1, wherein said layer of adhesive is a layer of lacquer between the outer gripping surface and the thin layer of sand for aiding in the adhesion between the outer gripping surface and the thin layer of sand.

15. A lightweight perch in accordance with claim 1, wherein said threaded fastener extends outwardly from said base.

16. A lightweight perch in accordance with claim 1, wherein said attaching means further comprises a cap engageable with said fastener, said fastener adapted to extend through an opening on one side of a birdcage wall and said cap adapted to engage said fastener on another side of said birdcage wall for securely clamping said perch to said birdcage wall.

17. A lightweight perch in accordance with claim 1, wherein the perch further comprises a longitudinal axis, and wherein the outer gripping surfaces extends continuously around the longitudinal axis.

18. A lightweight perch suitable for gripping by a bird and attaching to a birdcase comprising:
   a) a tip, a base opposite said tip and an outer gripping surface disposed between said tip and base,
   b) a granular material adhered to said outer gripping surface, and
   c) means for attaching the perch to a birdcage,
   d) wherein said attaching means are integrally formed with said base, and
   g) wherein said perch is formed from plastic resin, and wherein said outer surface of said perch softens when heated and becomes adapted to receive and retain said granular material applied thereto without the use of adhesives.

19. A lightweight perch suitable for gripping by a bird and attaching to a birdcage comprising:
   a) a tip, base opposite said tip and an outer in surface disposed between said tip and base,
   b) a granular material adhered to said outer in surface, and
   c) means for attaching the perch to a birdcage,
   d) wherein said attaching means are integrally formed with said base, and
   e) further comprising a layer of solvent between the outer gripping surface and the granular material for aiding in the adhesion between the outer gripping surface and the granular material.

20. A lightweight perch in accordance with claim 19, wherein said solvent further comprises tolulene.

21. A lightweight perch in accordance with claim 19, wherein said solvent further comprising methyl ethyl ketone.

22. A lightweight perch suitable for gripping by a bird and attaching to a birdcage comprising:
   a) a tip, a base opposite said tip and an outer gripping in surface disposed between said tip and base,
   b) a granular material adhered to said outer gripping surface, and
   c) means for attaching the perch to a birdcage,
   d) wherein said attaching means are integrally formed with said base,
   e) wherein said perch is hollow,
   f) wherein said perch further comprises a longitudinal axis and wherein the outer gripping surfaces extends continuously around the longitudinal axis, and
   g) wherein the diameter of the perch varies along the longitudinal axis to vary tension felt by a bird gripping the outer gripping surface, further comprising means between the outer gripping surface and the granular material for aiding in the adhesion between the outer gripping surface and the granular material and wherein said attaching means further comprises a cap engageable with said a screw fastener, said screw fastener adapted to extend through an opening on one side of a birdcage wall and said cap adapted to engage said screw fastener on another side of said birdcage wall for securely clamping said perch to said birdcage wall.

23. A lightweight perch suitable for gripping by a bird and attaching to a birdcage comprising:
   a) a tip, a base opposite said tip and an outer gripping surface disposed between said tip and base, said tip and base extending along a longitudinal axis of said perch, and
   b) a thin layer of sand adhered to said outer gripping surface,
   c) wherein a diameter of the perch varies along the longitudinal axis to vary tension felt by a bird gripping the outer gripping surface, and
   d) wherein said outer gripping surface flares outwardly adjacent the base to discourage a bird from gripping the outer surface adjacent the base,
   e) wherein the diameter of the perch along the longitudinal axis is greatest at the base,
   f) wherein said outer in surface is textured separately and in addition to the application of the thin layer of sand, and
   g) wherein between outer gripping surface and the thin layer of sand there is provided a layer of one of adhesive, solvent, paint and lacquer for aiding in the adhesion between the outer in surface and the thin layer of sand.

24. A lightweight perch in accordance with claim 23, further comprising means for attaching the perch to a birdcage.

25. A lightweight perch in accordance with claim 24, wherein said attaching means further comprises a threaded fastener integrally embedded into said base.

26. A lightweight perch in accordance with claim 23, wherein the perch is hollow and further comprises a longitudinal axis, and wherein the outer gripping surfaces extends continuously around the longitudinal axis.

27. A lightweight perch suitable for gripping by a bird attaching to a birdcage comprising:
   a) a tip, a base opposite said tip and an outer in surface disposed between said tip and base, said base having a threaded fastener integrally embedded therein for attaching the perch to a birdcage, said tip and base extending along a longitudinal axis of said perch, and
   b) a granular material adhered to said outer gripping surface, c) wherein a diameter of the perch varies along the longitudinal axis to vary tension felt by a bird gripping the outer gripping surface, d) wherein said outer gripping surface flares outwardly adjacent the base to discourage a bird from gripping the outer surface adjacent the base, and e) a cap engageable with said fastener, said fastener adapted to extend through an opening on one side of a birdcage wall and said cap adapted to engage said fastener on another side of said birdcage wall for securely clamping said perch to said birdcage wall.

28. A lightweight perch suitable for gripping by a bird and attaching to a birdcage comprising:

a) a tip, a base opposite said tip an outer gripping surface disposed between said tip and base, said tip and base extending along a longitudinal axis of said perch, and b) a granular material adhered to said outer gripping surface, c) wherein a diameter of the perch varies along the longitudinal axis to vary tension felt by a bird gripping the outer gripping surface, d) wherein said outer gripping surface flares outwardly adjacent the base to discourage a bird from gripping the outer surface adjacent the base, and e) further comprising means for suspending said perch from a top of a birdcage.

29. A lightweight perch suitable for gripping by a bird and attaching to a birdcage comprising:

a) a tip, a base opposite said tip and an outer gripping surface disposed between said tip and base, said tip and base extending along a longitudinal axis of said perch, and b) a granular material adhered to said outer gripping surface, c) wherein a diameter of the perch varies along the longitudinal axis to vary tension felt by a bird gripping the outer gripping surface, d) wherein said outer gripping surface flares outwardly adjacent the base to discourage a bird from gripping the outer surface adjacent the base, and e) further comprising means for anchoring said perch to a floor of a birdcage.

30. A perch comprising:

a) a first end, a second end opposite said first end and an outer gripping surface disposed between said first and second ends, said outer gripping surface having a thin layer of granular material adhered thereto by a thin layer of adhesive, said outer gripping surface, thin layer of adhesive and thin layer of granular material forming three distinct layers of material, b) wherein said outer gripping surface flares outwardly adjacent one of said first and second ends to deter a bird from gripping the outer surface adjacent said end, and c) wherein said first end, second end and outer gripping surface are formed as a one-piece, hollow, injection-molded structure.

31. A perch in accordance with claim 30, wherein said outer gripping surface further comprises a top portion and a bottom portion, and wherein said outer gripping surface extends completely around said top and bottom portions such that neither of said top or bottom portions are open.

32. perch in accordance with claim 30, further comprising:

an injection molded first part, and an injection molded second part attached to said injection-molded first part to form said one-piece, hollow, injection-molded structure.

33. An injection molded perch in accordance with claim 32, wherein said injection molded first and second parts are attached by one of glue, welding, or a non-adhesive mechanical connection.

34. A one-piece, injection-molded hollow perch comprising:

a) a first end, a second end opposite said first end and an outer gripping surface disposed between said first and second ends along a longitudinal axis of said perch, b) a granular material applied in whole or in part to said outer gripping surface, and c) a fastener integrally embedded into said perch at one of said first and second ends, d) wherein said granular material is a thin layer of sand adhered to said outer gripping surface by a thin layer of adhesive said outer in surface, adhesive and sand forming three distinct layers of material.

35. A one-piece, injection-molded hollow perch in accordance with claim 34, wherein said perch is initially formed as two injection-molded sections that are secured together into one piece.

* * * * *